United States Patent
Kikkeri Shivadatta et al.

(10) Patent No.: US 10,742,707 B2
(45) Date of Patent: Aug. 11, 2020

(54) LOW LATENCY MULTIMEDIA STREAMING SYSTEM AND METHOD

(71) Applicant: ITTIAM SYSTEMS (P) LTD., Bangalore (IN)

(72) Inventors: Darshan Datt Kikkeri Shivadatta, Bangalore (IN); Swapan Kumar Kundu, Bangalore (IN); Bhavani Gopalakrishna Rao, Santa Clara, CA (US); Puneet Gupta, Bangalore (IN); Manu Ramakrishna Iyengar, Bangalore (IN); Himanshu Mukat, Bangalore (IN)

(73) Assignee: ITTIAM SYSTEMS (P) LTD., Bangalore, Karnataka (IN)

(*) Notice: Subject to any disclaimer, the term of this patent is extended or adjusted under 35 U.S.C. 154(b) by 454 days.

(21) Appl. No.: 15/493,163

(22) Filed: Apr. 21, 2017

(65) Prior Publication Data

US 2017/0318068 A1 Nov. 2, 2017

(30) Foreign Application Priority Data

Apr. 29, 2016 (IN) .............................. 201641015057

(51) Int. Cl.
*H04L 29/06* (2006.01)
*H04L 12/863* (2013.01)
(Continued)

(52) U.S. Cl.
CPC .......... *H04L 65/607* (2013.01); *H04J 3/0632* (2013.01); *H04L 47/62* (2013.01); *H04N 21/242* (2013.01); *H04N 21/4305* (2013.01); *H04N 21/44004* (2013.01); *H04N 21/44209* (2013.01); *H04N 21/64322* (2013.01)

(58) Field of Classification Search
CPC ...... H04L 65/607; H04L 47/62; H04J 3/0632; H04N 21/242; H04N 21/4305; H04N 21/44004; H04N 21/44209; H04N 21/64322
See application file for complete search history.

(56) References Cited

U.S. PATENT DOCUMENTS 7,701,884 B2 * 4/2010 Chapweske ........... H04L 1/0002
370/260
9,843,844 B2 * 12/2017 Walker ............... H04N 21/6125
(Continued)

*Primary Examiner* — Patrice L Winder
*Assistant Examiner* — Aye M Aung
(74) *Attorney, Agent, or Firm* — Prakash Nama; Global IP Services, PLLC

(57) ABSTRACT

In one example, a method for low-latency multimedia stream reception and output in a receiving device is described. Data packets may be extracted from a multimedia stream received over a network. The sequence of independently decodable units associated with the multimedia stream may be decoded. Each independently decodable unit may include one or more data packets. The sequence of decoded units may be stored in an output buffer. Further, flow of the decoded units from the output buffer to an output device may be controlled based on one of (a) a latency associated with the decoded units and (b) a rate of reception of the decoded units by the output buffer and a rate at which the output device is operating. The decoded units may be rendered on the output device.

21 Claims, 6 Drawing Sheets

(51) Int. Cl.
    *H04N 21/44*     (2011.01)
    *H04N 21/442*     (2011.01)
    *H04N 21/643*     (2011.01)
    *H04N 21/242*     (2011.01)
    *H04N 21/43*     (2011.01)
    *H04J 3/06*     (2006.01)

(56) References Cited

U.S. PATENT DOCUMENTS

| | | | |
|---|---|---|---|
| 10,033,587 B2* | 7/2018 | Tofighbakhsh | H04L 47/22 |
| 10,117,229 B2* | 10/2018 | Tseng | H04W 72/04 |
| 2007/0030986 A1* | 2/2007 | McArthur | H04H 20/28 |
| | | | 381/311 |
| 2011/0222839 A1* | 9/2011 | Ohhara | G11B 27/005 |
| | | | 386/353 |
| 2013/0163579 A1* | 6/2013 | Yadav | H04L 65/605 |
| | | | 370/352 |
| 2015/0348558 A1* | 12/2015 | Riedmiller | G10L 19/167 |
| | | | 704/500 |

\* cited by examiner

LOW LATENCY MULTIMEDIA STREAMING SYSTEM AND METHOD

RELATED APPLICATIONS

Benefit is claimed under 35 U.S.C. 119(a)-(d) to Foreign Application Serial No. 201641015057 filed in India entitled "METHOD FOR LOW LATENCY NETWORK VIDEO PLAYBACK ON A MULTI-PROCESSOR/MULTI-CORE PLATFORM", on Apr. 29, 2016, by Ittiam Systems (P) Ltd., which is herein incorporated in its entirety by reference for all purposes.

TECHNICAL FIELD

The present disclosure generally relates to multimedia streaming, and particularly to low latency playback of multimedia streams.

BACKGROUND

For latency critical multimedia data (e.g., video/audio) communication, typically, uncompressed or raw data transmission has been used. However, such systems may have limitations in terms of bandwidth requirement, transmission distance, and the like. Further, integrating such systems with other digital systems, such as media gateways and storage devices, can be a challenge. Transmission of compressed data can address the limitations pertaining to raw data transmission. Transmission of compressed data can also enable integration of such systems with other digital systems such as media gateways, storage devices and the like. Processes, such as sampling of analog signals, grouping of samples for encoding, encoding, transmission of encoded data, decoding, and rendering, used in the compressed data transmission can affect the end-to-end transmission latency.

In systems where a multimedia stream (e.g., digital data) is encoded by a transmitting device (e.g., server) and transmitted in packets of the multimedia stream, and decoded by a receiving device (e.g., client), the transmitting device may receive data that includes digital samples of analog signals. Each digital sample may be of a specific size (e.g., 16 bits). A sampling rate represents the number of samples taken per unit of time (e.g., seconds, milliseconds). The transmitting device groups the samples into the packets for transmission to the receiving device.

Source clock, transmission device clocks, and receiving device clocks are major clock components of such transmission systems. Further, the transmission device clocks include a clock for pre-processing, clock for encoding, and clock for streaming. In some transmission devices, all these clocks may be derived from a common transmitting device system clock. Further, receiver device clocks include a network receive clock, decoder clock, post-processing clock, and output clock. In some receiving devices, all these clocks may be derived from a common receiving device system clock.

In some transmission systems where the source is tightly coupled with the transmission system, all clocks involved may be synchronized with the source clock, thus eliminating all clock drift problems. In such systems, the encoder system clock is synchronized with source clock using phase locked loops (PLLs). All other clocks for the encoder are derived from encoder system clock. All decoder clocks are derived from a decoder system clock. Decoder system clock is synchronized with encoder system clock. System clock references (SCRs) (as described in Generic Coding of Moving Pictures and Associated Audio: Systems, Recommendation H.222.0, ISO/IEC 13818-1, Apr. 25, 1995 ("MPEG-2 Specification")), precision time protocol (PTP), and network time protocol (NTP) are examples of mechanisms used for synchronizing encoder and decoder system clocks.

Synchronization of all clocks in a transmission system may not be always feasible. This may occur, for example, when source is independent of the transmission system. This may also occur when a processor based system is used as the encoder/decoder (for example, in a personal computer system employing an audio card to decode digital audio signals, where many different components of personal computers may have their own clocks, and there is no synthesized clock present in the personal computer system. Audio cards generally each contain their own crystal clocks, which cannot be adjusted to accomplish synchronization with another clock).

BRIEF DESCRIPTION OF THE DRAWINGS

Examples are described in the following detailed description and in reference to the drawings, in which.

DETAILED DESCRIPTION

Figure 1A:
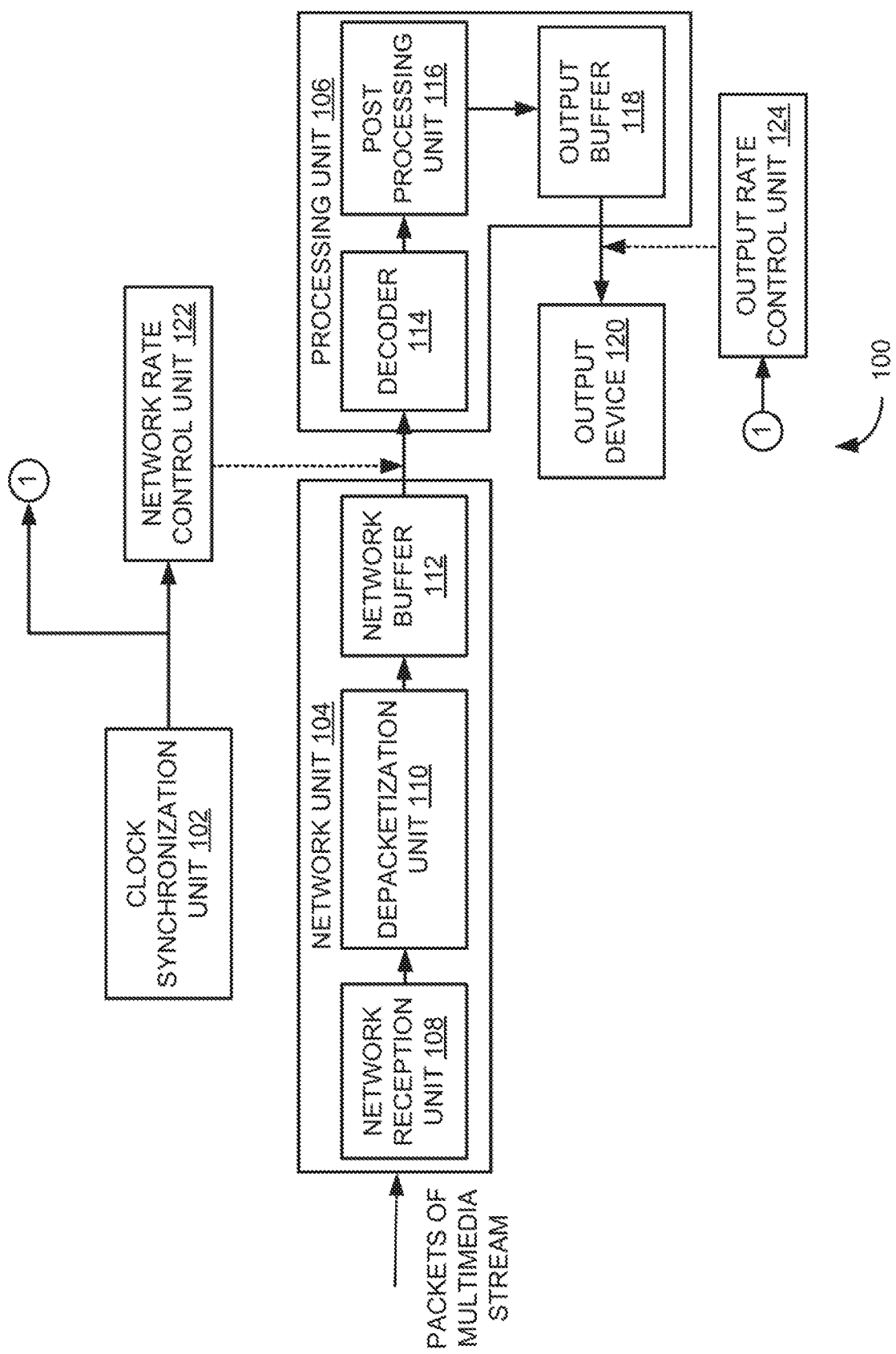
FIG. 1A illustrates an example block diagram of a receiving device for low latency playback in multimedia streaming systems.

Embodiments described herein may provide a system and method for low latency multimedia streaming where source clock is independent of other clocks used in a transmission system. In systems where multimedia stream (e.g., digital data) is encoded by an encoder, transmitted in packets of multimedia stream, and decoded by a receiver, the encoder at a transmitting device may receive data that includes digital samples of analog signals from the source. The encoder groups and encodes the samples into packets for transmission to a decoder in a receiving device. Since the source to generate multimedia data, transmitting device to capture, encode, and stream the multimedia data (e.g., audio and/or video data), and the receiving device to decode and render the multimedia data may be independent pieces of hardware and may use separate crystals for generating respective system clocks, there may be differences in rate at which the data is generated, transmitted, and consumed. This may lead to overflow or underflow of buffers at the playback end. When small buffers are used at the playback end, effect of the clock drift between the transmitting device and the receiving device may be amplified, which needs to be accounted for during rate control design at the playback end.

Examples described herein may realize a low latency multimedia streaming in playback system (i.e., receiving device) that could be used to realize low end-to-end latency in compression based multimedia communication systems. In one example, the receiving device may include a network unit to extract data packets from a multimedia stream received over a network. Further, the receiving device may include a processing unit including a decoder to decode a sequence of independently decodable units (e.g., frames, slices, samples, and the like) associated with the multimedia stream and an output buffer to store the sequence of decoded units. Each independently decodable unit may include one or more data packets. Furthermore, the receiving device may include a clock synchronization unit to determine whether the receiving device's system clock can be synchronized with a transmitting device's system clock. Clock synchronization unit, can use NTP, PTP or MPEG-2 TS, or such hardware/software implemented protocols to achieve clock synchronization (e.g., to an order of few milliseconds) between the transmitting device's and receiving device's system clocks. In addition, the receiving device may include an output rate control unit to control flow of the decoded units from the processing unit to an output device based on the determination.

In one example, the output rate control unit may control the flow of the decoded units from the processing unit to the output device by converting sampling rate of one or more decoded units based on the latency associated with the decoded units, when the receiving device's system clock can be synchronized with the transmitting device's system clock. In another example, the output rate control unit may control the flow of the decoded units from the processing unit to the output device by converting the sampling rate of the one or more decoded units based on the rate of reception of the decoded units by the output buffer and the rate at which the output device is operating, when the receiving device's system clock cannot be synchronized with the transmitting device's system clock. For example, the receiving device, transmitting device or both may not have a common system clock, from which other internal clocks are derived, is considered a case where the receiving device's system clock cannot be synchronized with the transmitting device's system clock.

Examples described herein may enable low end-to-end latency (e.g., approximately 30 ms) while using compression based multimedia (e.g., video) transmission and reception systems. Examples described herein may enable usage of such systems for latency critical application classes such as a keyboard video mouse (KVM), video conferencing, video surveillance, video guided unmanned aerial vehicle (UAVs), healthcare (video guided procedures) and the like.

Examples described herein may provide a method for handling constraints such as server/client clock drifts, network and processing jitter for achieving low end-to-end latencies. Examples described herein may handle processing jitter to reduce frame drops (e.g., video quality degradation). Examples described herein may identify and handle server/client clock drifts to reduce frame drops (e.g., video quality degradation). Examples described herein may provide a buffering model to minimize the effect of jitter due to increased frequency of inter process communication (IPC). Examples described herein may adapt to different network infrastructure.

The terms "server" and "transmitting device" are used interchangeably throughout the document and may refer to a device to transmit multimedia (e.g., audio/video) stream/data packets. The terms "receiving device" and "client device" and "client" are used interchangeably throughout the document and may refer to a device to receive the transmitted multimedia stream/data packets across network. Furthermore, the terms "frames", "slices" and "samples" are used interchangeably and may refer to "decoded units". Terms "sample rate up/down conversion" and "sample skip/repeat", and "frame skip/repeat" are used interchangeably throughout the document. Terms "render" and "output" are used interchangeably throughout the document.

Referring to Figures, FIG. 1A illustrates an example block diagram of a receiving device 100 for low latency playback in multimedia streaming systems. The receiving device 100 may include a network unit 104, a processing unit 106 communicatively coupled to the network unit 104, and an output device 120 communicatively coupled to the processing unit 106. Further, the network unit 104 may include a network reception unit 108, a depacketization unit 110, and a network buffer 112. Furthermore, the processing unit 106 may include a decoder 114, a post processing unit 116, and an output buffer 118.

The receiving device 100 may allow different blocks (e.g., units) to operate simultaneously on independent chunks (e.g., frames) of data. The receiving device 100 may be enabled to parallelize different operations thereby reducing latency. The receiving device 100 may enable to absorb any jitter introduced into the multimedia/data stream. Each block may wait for availability of data from an upstream block to proceed with data processing. Each block may push processed data to the next block without any delays. In case various blocks may be sharing the same resource (e.g., processor) for execution, the priorities may be assigned in increasing order from source to sink, thereby, prioritizing data consumption and preventing build-up of buffering and hence delay in the pipeline.

The receiving device 100 may include a clock synchronization unit 102. The clock synchronization unit 102 may try to synchronize receiving device's reference clock with that of transmitting device's system clock (e.g., clock used for stamping presentation time stamps (PTS)) to an order of milliseconds (ms). Example methods such as precision time protocol (PTP), network time protocol (NTP), and the like may be used by the clock synchronization unit 102 to achieve the synchronization. The clock synchronization unit 102, based on success/failure of synchronization, configures other elements of the receiving device 100.

Figure 1B:
FIG. 1B illustrates an example system for broadcasting audio/video streaming, including the receiving device, such as shown in FIG. 1A.

In operation, the network unit 104 may extract data packets from a multimedia stream received over a network. FIG. 1B illustrates an example system 150 for streaming multimedia to the receiving device 100. As shown in FIG. 1B, a transmitting device 152 transmits data packets corresponding to the multimedia stream to the receiving device 100 across the network 154. For example, the multimedia stream may be an output of the transmitting device 152. Example compression formats used for data packets (e.g., audio/video data) may include H.264, moving picture experts group2 (MPEG-2), and the like. Example formats used for multimedia stream for transmission over network may include MPEG-2 TS, Real-time Transport Protocol (RTP) and the like. Packets that can be transmitted over the network 154 may include transmission control protocol/user datagram protocol (TCP/UDP) header, and the like, in addition to multimedia stream headers and data packet headers.

In one example, the network unit 104 may include the network reception unit 108 to receive the multimedia stream from the transmitting device 152 over the network 154. The network reception unit 108 may receive packets of the multimedia stream from the network, demodulates and forwards the packets to the de-packetization unit 110. Latency introduced by the network reception unit 108 may be the time taken for demodulation and can be negligible. For example, latency introduced by the network reception unit 108 can be considered 0 ms for practical purposes.

Further, the network unit 104 may include the depacketization unit 110 to extract the data packets from the received multimedia stream. Furthermore, the network unit 104 may include the network buffer 112 to store the extracted data packets. For example, the depacketization unit 110 may extract H.264 elementary data packets from the MPEG-2 TS multimedia stream, and place these packets into the adjoining network buffer 112. The multimedia stream headers may allow the depacketization unit 110 to take care of any network re-ordering. Latency introduced by the depacketization unit 110 can be due to the parsing of the multimedia stream to extract data packets. Latency introduced by the depacketization unit 110 can be negligible and can be considered 0 ms for practical purposes. Further, the de-packetizing unit's operations can be serialized with the network reception unit's operations as de-packetizing is not time consuming, thereby eliminating the need for a buffer between the depacketization unit 110 and the network reception unit 108.

Further in operation, the processing unit 106 may include a decoder 114 to decode the sequence of independently decodable units associated with the multimedia stream. In one example, each independently decodable unit may include one or more data packets. In one example, the receiving device 100 may include the network rate control unit 122 to control a rate and time at which the sequence of independently decodable units is extracted from the network buffer 112. In one example, the clock synchronization unit 102 may determine whether a system clock of receiving device 100 can be synchronized with a system clock of transmitting device 152. The network rate control unit 122 may allow extraction of independently decodable units from the network buffer 112 as needed by the decoder 114 without regulation when the receiving device's system clock can be synchronized with the transmitting device's system clock. The network rate control unit 122 can be switched off, and thereby decodable units (e.g., video data) are passed onto the decoder 114 as soon as the decodable unit (e.g., video data) is generated by the de-packetization unit 110.

The network rate control unit 122 may control a rate and time at which the sequence of independently decodable units is extracted from the network buffer 112 based on jitter to be handled and rate at which independently decodable units are received by the network buffer 112 when the receiving device's system clock cannot be synchronized with the transmitting device's system clock. Jitter may refer to a deviation from the periodicity of arrival of multimedia packets from the network. In this case, the network rate control unit 122 may control the rate and time at which the independently decodable units (e.g., frames) are extracted from the network buffer 112. At the start of operation, for a predefined duration (e.g., $D_{INIT}$), the pipeline can operate freely without any introduced latencies (e.g., decodable units are extracted as soon as they are ready without any additional regulation). During $D_{INIT}$, the network rate control unit 122 may measure the rate at which the transmitting device 152 is generating the decodable units (i.e., $R_S$ frames/second).

Once $D_{INIT}$ is complete, the network rate control unit 122 performs the following to absorb network jitter.

a. Introduces a delay of $L_N$ by blocking operation for that time.

b. Allows the downstream blocks to extract frames at a rate no greater than $R_S$ frames/second.

Initial buffering would be calculated as $L_N*B$, where B is the bit rate, i.e., rate at which compressed multimedia data (data packets) is generated at the output of the transmitting device 152. The size of network buffer 112 may be $2*(L_N*B)$. This may ensure initial occupancy of the network buffer 112. When the jitter introduced by the network is within $L_N$, the network buffer 112 may absorb the jitter. In case the network buffer 112 underflows, underflow is detected and a fresh delay of $L_N$ may be introduced to allow buffer to build up. Through above mechanism, network jitter and scheduling jitter introduced by network unit are absorbed.

In one example, $L_N$ is calculated as follows:

$$L_N = J_{S108} + J_{S110} + J_N + T_N$$

where $J_{S108}$ and $J_{S110}$ are scheduling jitters for the network reception unit 108 and depacketization unit 110 respectively, $J_N$ is the maximum network jitter expected to be handled, $T_N$ is the time taken by the network to transmit a frame. $T_N$ also needs to account for the bitrate profile of the encoded stream and consider the size of a maximum possible encoded frame.

Network jitter may depend on the network infrastructure used for deployment and may vary with each deployment. The delay introduced could be made configurable for every installation. This knob may be used to configure the system for each deployment scenario. The network rate control unit 122 stamps each frame with the time ($T_{NB}$) the frame was removed from the network buffer 112. Time stamp ($T_{NB}$) can be passed along with the frame as metadata by the blocks of the receiving device pipeline. The capture time (i.e., time when the multimedia sample was captured by the transmitting device), as per transmitting device's system clock, provided by transmitting device 152 as frame metadata (e.g., MPEG-2 TS user data extensions and the like can be used for transmitting this data between transmitting device and receiving device), along with PTS and DTS information, is propagated along with the frame by network unit 104.

The decoder 114 may decode the sequence of independently decodable units associated with the multimedia stream that are extracted from the network buffer 112. In one example, each independently decodable unit may include one or more data packets. Example decodable unit may include a frame or a portion of the frame (e.g., slice) that can be decoded independently. The processing unit 106 may further include the post processing unit 116 communicatively connected between the decoder 114 and the output buffer 118 to post process (e.g., resizing, de-interlacing, and the like) the sequence of decoded units and to place the post processed sequence of decoded units into the output buffer 118. The output buffer 118 may store the sequence of decoded units. The decoder 114 and post processing unit 116 may pass all time stamps/metadata information and the like provided by upstream blocks (e.g., capture time provided by the transmitting device 152, $T_{NB}$, PTS and DTS information), along with each frame as metadata.

Figure 3:
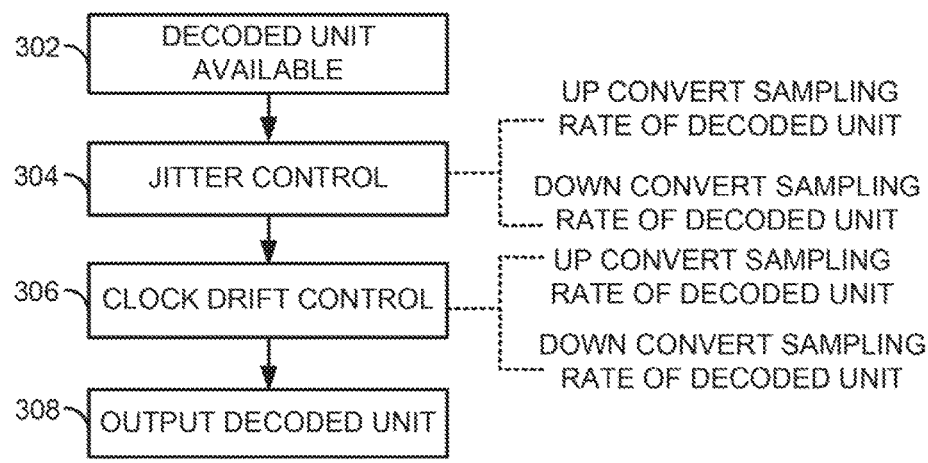
FIG. 3 illustrates an example logic for controlling flow of decoded units from processing unit into an output device, such as shown in FIG. 1A.

In one embodiment, the receiving device 100 may include an output rate control unit 124 to control flow of the decoded units from the processing unit 106 to the output device 120 based on one of: (a) a latency associated with the decoded units and (b) a rate of reception of the decoded units by the output buffer 118 and a rate at which the output device 120 is generating synchronization signals. In this case, the synchronization signals may be used to determine the rate at which the output device 120 is operating. The output device 120 may render the decoded units. Example output device 120 may include a display, speakers, and the like. An example logic for controlling flow of decoded units from the processing unit 106 into the output device 120 is shown in FIG. 3.

Furthermore, in operation, the clock synchronization unit 102 may try to synchronize receiving device's system clock with transmission device's system clock. In one embodiment, the output rate control unit 124 may control the flow of the decoded units from the processing unit 106 to the output device 120 by converting sampling rate of one or more decoded units based on the latency associated with the decoded units when the receiving device's system clock can be synchronized with the transmitting device's system clock.

In this case, the output rate control unit 124 may calculate the latency associated with each decoded unit by subtracting a captured time associated with each decoded unit from a current time as shown by receiving device's system clock. The output rate control unit 124 may down convert the sampling rate (e.g., by skipping) of the one or more decoded units having a latency greater than a predetermined maximum latency. The output rate control unit 124 may up convert the sampling rate (e.g., by repeating) of the one or more decoded units having the latency less than a predetermined minimum latency. The output rate control unit 124 may forward the one or more decoded units having a latency between the predetermined minimum latency and the predetermined maximum latency to the output device 120 without any conversion. Examples described herein may use skipping and repeating of decoded units as means of sample rate down conversion and sample rate up conversion. However, other variants of this illustration may use other modes of sample rate conversions such as interpolation, filtering, and the like. Examples described herein may use video frame as decoded unit. However, other variants of this illustration may use sub-frames or frames of other multimedia streams such as audio.

For example, the predetermined maximum latency and the predetermined minimum latency may be computed using the equations:

$$L_{END\text{-}TO\text{-}END}(\max) = L_{TRANSMITTING\ DEVICE} + L_{RECEIVING\ DEVICE}(\min) + FD,$$

$$L_{END\text{-}TO\text{-}END}(\min) = L_{TRANSMITTING\ DEVICE} + L_{RECEIVING\ DEVICE}(\min),$$

where $L_{END\text{-}TO\text{-}END}(\max)$ is the predetermined maximum latency, $L_{END\text{-}TO\text{-}END}(\min)$ is the predetermined minimum latency, $L_{TRANSMITTING\ DEVICE}$ is a maximum latency associated with the transmitting device 152, FD is a duration of a decoded unit (e.g., estimated time duration between two captured frames or time duration represented by captured frame), and $L_{RECEIVING\ DEVICE}(\min)$ is a minimum latency associated with the receiving device 100. An example logic for converting sampling rate of one or more decoded units based on the latency associated with the decoded units is explained in FIG. 5.

In another embodiment, the output rate control unit 124 may control the flow of the decoded units from the processing unit 106 to the output device 120 by converting the sampling rate of the one or more decoded units based on the rate of reception of the decoded units by the output buffer 118 and the rate at which the output device 120 is operating (for example, by recording the rate at which output device is generating synchronization signals), when the receiving device's system clock cannot be synchronized with the transmitting device's system clock.

In this example, the output rate control unit 124 may record the rate at which the output device 120 is operating and the rate of reception of the decoded units by the output buffer 118 during rendering of initial decoded units for a predefined initial duration. The output rate control unit may up convert the sampling rate of decoded units if the rate of reception of decoded units is less than the rate of operation of output device. The output rate control unit may down convert the sampling rate of decoded units if the rate of reception of decoded units is less than the rate of operation of output device. Examples described herein may use skipping and repeating of decoded units as means of sample rate down conversion and sample rate up conversion. However, other variants of this illustration may use other modes of sample rate conversions such as interpolation, filtering, and the like. Examples described herein may use video frame as decoded unit. However, other variants of this illustration may use sub-frames or frames of other multimedia streams such as audio. Further, the output rate control unit 124 may calculate a time interval for converting the sampling rate of the one or more decoded units based on the rate at which the output device 120 is operating and the rate of reception of the decoded units by the output buffer 118.

For example, the time interval for converting the sampling rate of the one or more decoded units is calculated using an equation:

$$T_{CLOCKDRIFT} = FD_S * FD_C / FD_{DIFF},$$

where $FD_C$ refers to supposed decoded unit duration as per receiving device's 100 system clock, $FD_S$ refers to average duration of decoded units as measured at the receiving device 100 and $FD_{DIFF}$ refers to difference in actual and supposed duration of the decoded units as per receiving device's system clock.

Further, $FD_C$, $FD_S$ and $FD_{DIFF}$ are computed using the equations:

$$FD_C = 1/R_C,$$

wherein $R_C$ is the rate at which the output device 120 is generating the synchronization signals (i.e., operating), $$FD_S = 1/R_S,$$

wherein $R_S$ is the rate of reception of the decoded units by the output buffer 118, and $$FD_{DIFF} = abs(FD_S - FD_C).$$

The output rate control unit 124 may convert the sampling rate (e.g., by skipping or repeating) of the one or more decoded units after the predefined initial duration based on the corresponding calculated time interval. An example process for converting the sampling rate of the one or more decoded units after the predefined duration based on the corresponding calculated time interval, may include:

1. for a decoded unit, determine whether the calculated time interval has elapsed since a previous conversion of the sampling rate (e.g., referred to as an action), 2. when the calculated time interval has not elapsed since the previous conversion, forward the decoded unit to the output device 120,
3. when the calculated time interval has elapsed since the previous conversion:
   a. down convert sampling rate of decoded unit when the rate of reception of the decoded unit by the output buffer 118 is greater than the rate at which the output device 120 is generating the synchronization signals, and
   b. up convert sampling rate of the decoded unit when the rate of reception of the decoded unit by the output buffer 118 is not greater than the rate at which the output device 120 is generating synchronization signals.

Figure 6:
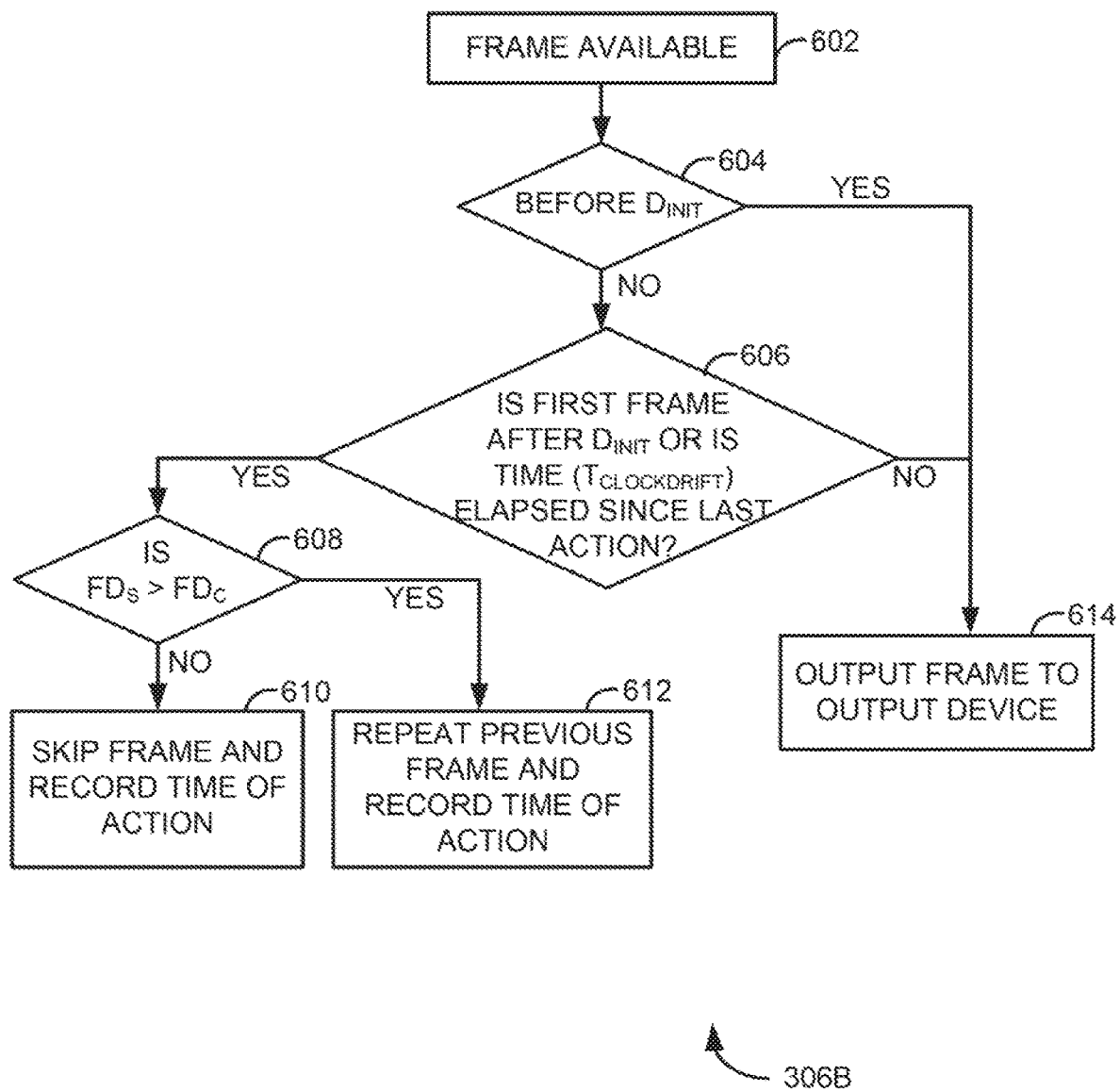
FIG. 6 illustrates another example logic for controlling the flow of the decoded units by converting the sampling rate of the one or more decoded units based on the rate of reception of the decoded units by the output buffer and the rate at which the output device is operating.

An example logic for converting sampling rate of one or more decoded units based on the rate of reception of the decoded units by the output buffer 118 and the rate at which the output device 120 is generating synchronization signals is explained in FIG. 6.

In one example, the components of the receiving device 100 may be implemented in hardware, machine-readable instructions or a combination thereof. In one example, each of the clock synchronization unit 102, the network reception unit 108, the depacketization unit 110, the network buffer 112, the decoder 114, the post processing unit 116, the output buffer 118, the network rate control unit 122, and the output rate control unit 124 may be implemented as engines or modules comprising any combination of hardware and programming to implement the functionalities described herein. Even though FIG. 1A describes about the receiving device 100, the functionality of the components of the receiving device 100 may be implemented in other electronic devices such as personal computers (PCs), server computers, tablet computers, mobile devices and the like.

The receiving device 100 may include computer-readable storage medium comprising (e.g., encoded with) instructions executable by a processor to implement functionalities described herein in relation to FIG. 1A. In some examples, the functionalities described herein, in relation to instructions to implement functions of synchronization unit 102, the network reception unit 108, the depacketization unit 110, the network buffer 112, the decoder 114, the post processing unit 116, the output buffer 118, the network rate control unit 122, the output rate control unit 124 and any additional instructions described herein in relation to the storage medium, may be implemented as engines or modules comprising any combination of hardware and programming to implement the functionalities of the modules or engines described herein. The functions of components of the receiving device 100 may also be implemented by the processor. In examples described herein, the processor may include, for example, one processor or multiple processors included in a single device or distributed across multiple devices.

Figure 2:
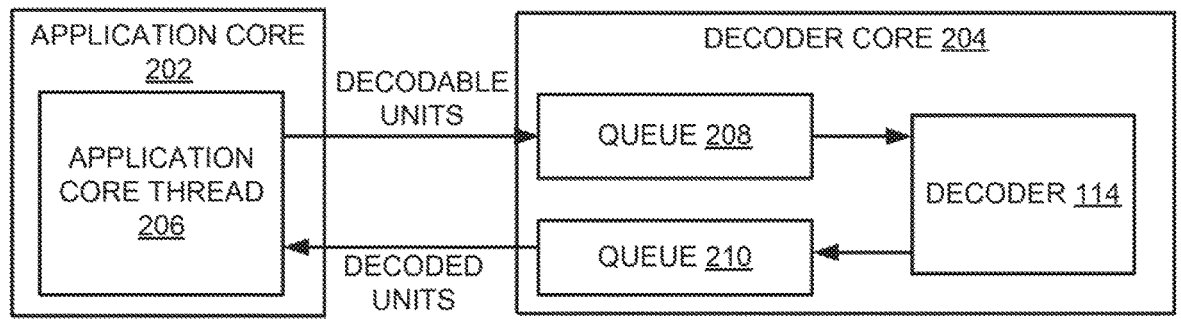
FIG. 2 illustrates an example multi-core/multi-processor platform with dedicated cores for different functional blocks associated with the receiving device, such as shown in FIG. 1A.

FIG. 2 illustrates an example multi-core/multi-processor platform 200 with dedicated cores (e.g., 202 and 204) for different functional blocks associated with the receiving device 100, such as shown in FIG. 1A. For example, multi-core/multi-processor platform 200 may include application-specific integrated circuits (ASICS), graphics processing unit (GPU) or hardware accelerators for encoding/decoding, dedicated cores for video pre/post processing, capture and render. However, realization of pipeline which ties together these blocks may be in software. This software or the media middleware may run on the application core or application processor 202 which may also be used for implementing the user interface. Communication of data/events between different cores may happen through shared memory. Communications may include context switching/pre-emption on one or both the cores. This causes the inter-process communication (IPC) to have associated jitter and latency. This may depend on priority of tasks/threads on each of the processors.

Decoder 114 may decode frames/slices (i.e., independently decodable units). In case of slice decode, the maximum latency introduced by the decoder 114 may be a maximum of $FD_S$ (Frame duration as per server)/N (Number of slices) milliseconds. In platforms using separate dedicated hardware block for decoding (e.g., accelerators, ASICS, GPU, and the like), the decoder 114 may start by buffering one decodable unit (e.g., one slice worth of data) on the dedicated hardware (latency added $FD_S/N$).

The thread 206 running in application core 202 may read data (i.e., decodable unit) from the network buffer 112 and pushes the data to the queue 208 on the decoder core 204. The decoder 114 may read decodable unit from the queue 208 and pushes the decoded unit to queue 210. Application core 202 may then read decoded units and route them to the post processing unit 116, thereby helping in parallelizing the decoding and IPC operations. Starting with buffering of one decodable unit in this queue may ensure any latency/jitter associated with IPC does not affect timeliness of decoding operation. This may reduce the latency added to the system to 2 decodable units. Further, this may allow the decoder to use full duration for decoding and also allow the system to be designed to use higher number of slices.

In one example, queues 208 and 210 may be operated with one slot and in overwrite mode to prevent any buffer (latency) build up in the decoder 114. The decoded units can be processed by the post processing unit 116. The post processing unit 116 may include similar architecture as the decoder 114. The post processed units ready for rendering are kept into the output buffer 118. The maximum latency introduced by the post processing unit 116 may be $FD_S/N$. Example post processing may include resizing, de-interlacing, and the like for video data.

FIG. 3 illustrates an example logic 300 for controlling the flow of decoded units from processing unit 106 into the output device 120, such as shown in FIG. 1A. FIG. 3 illustrates the example logic 300 for the output rate control unit 124.

The output rate control unit 124 may control the output of decoded units from processing unit 106 into the output device 120. The output rate control unit 124 is responsible for handling processing jitter and scheduling jitter within the processing unit 106 as well as handling server-client clock drifts. The output rate control unit 124 may include two decision making blocks. One being jitter control block 304 which is explained in detail in FIG. 4. Other being clock drift control block 306 which is explained in detail in FIGS. 5 and 6. The decoded unit may be output, at 308, upon performing the jitter control and clock drift control as explained below.

Figure 4:
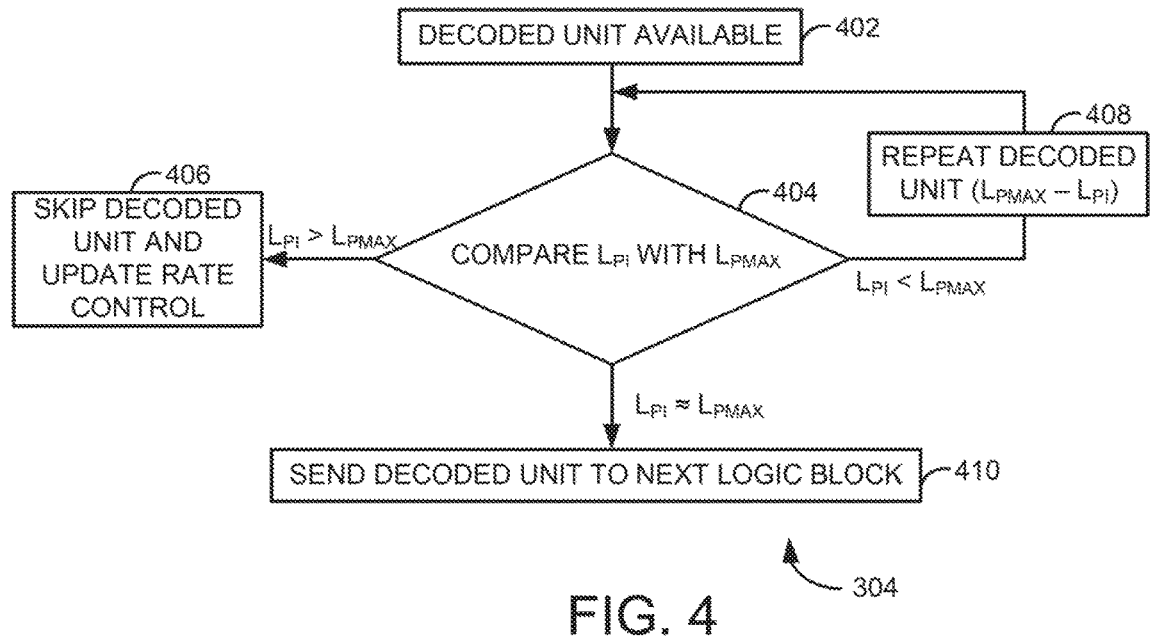
FIG. 4 illustrates an example logic for controlling jitter introduced in the processing unit.

FIG. 4 illustrates an example logic for controlling jitter introduced in the processing unit 106. FIG. 4 illustrates the example logic for the jitter control block 304 of the output rate control unit 124. When receiving device's system clock can be synchronized with the transmitting device's system clock, jitter control block 304 can be switched off. When receiving device's system clock cannot be synchronized with the transmitting device's system clock, Jitter control block 304 may absorb any jitter introduced in the pipeline post network buffer 112. Example jitter may include processing jitter introduced by decoder 114, post processing block 116 and scheduling jitter introduced at different blocks such as in case of software implementation.

Maximum possible processing latency for decoder 114/post processing unit 116 for a given implementation may be calculated as shown below and programmed into the jitter control block 304:

$$L_{Pmax}=L_{114}+L_{116}+J_{S114}+J_{S116},$$

where $L_{114}$ and $L_{116}$ are maximum latencies introduced by the decoder 114 and post processing unit 116 respectively, $J_{S114}$ and $J_{S116}$ are scheduling jitters for the decoder 114 and post processing unit 116 respectively. Output rate control unit 124 may decide to increase the buffer/latency in case the fraction of the decoded units skipped crosses a pre-defined threshold.

In one example, the stream can be de-jittered by ensuring all decoded units have undergone same latency $L_{Pmax}$ once the decoded unit moves out of the processing unit 106. This is done by delaying all decoded units which have undergone lesser latency. Latency ($L_{PI}$) undergone by each decoded unit (i) in the processing unit 106 is:

$$L_{PI}=\text{current time}-T_{NB}.$$

In one example, for video, availability of the first slice in the frame may be treated as frame (i.e., decoded unit) available event by the jitter control logic 304 as shown in block 402. At 404, latency ($L_{PI}$) undergone by each decoded unit is compared with the maximum possible processing latency ($L_{Pmax}$). In one example, at 406, the jitter control block 304 may down convert the sampling rate (e.g., skipping decodable units with $L_{PI}>L_{Pmax}$) of the one or more decoded units having the latency ($L_{PI}$) greater than the $L_{Pmax}$, and send the feedback the output rate control unit 124.

In another example, at 408, the jitter control block 304 may up convert the sampling rate of the one or more decoded units (e.g., by repeating decoded unit for time $L_{Pmax}-L_{PI}$) having the latency less than the $L_{Pmax}$. At 410, the jitter control block 304 may forward the one or more decoded units having the latency ($L_{PI}$) substantially equal to the $L_{Pmax}$ to the clock drift control block 306 without any conversion.

Figure 5:
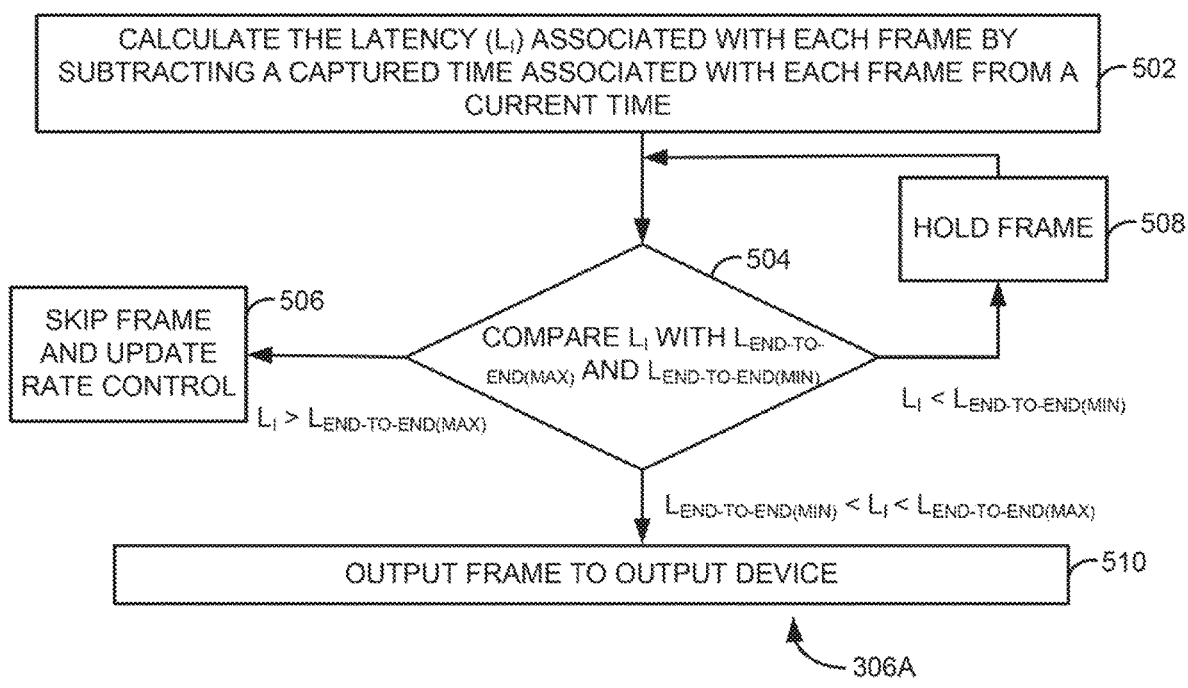
FIG. 5 illustrates an example logic for controlling the flow of the decoded units from the processing unit to the output device by converting sampling rate of one or more decoded units based on the latency associated with the decoded units.

FIG. 5 illustrates an example logic 306A for controlling the flow of the decoded units from the processing unit to the output device by converting sampling rate of one or more decoded units based on the latency associated with the decoded units. FIG. 5 illustrates the example logic 306A for the clock drift control block 306 of the output rate control unit 124. The clock drift control block 306A accounts for drifts between the server (i.e., the transmitting device 152) and the client (i.e., the receiving device 100) clocks by sample rate conversion of decoded units at the client 100 in one of the following manner.

When client's system clock is synchronized with server's system clock, the sampling rate of one or more decoded units may be converted based on the latency associated with the decoded units as explained below with respect to FIG. 5. In one example, end-to-end latencies (i.e., the predetermined maximum latency ($L_{END-TO-END}(max)$) and the predetermined minimum latency ($L_{END-TO-END}(min)$)) expected for a given implementation/deployment of the server 152 and the client 100 are calculated as shown below:

$$L_{END-TO-END}(max)=L_{SERVER}+L_{CLIENT}(max), \text{ and}$$

$$L_{END-TO-END}(min)=L_{SERVER}+L_{CLIENT}(min),$$

where $L_{SERVER}$ is the server's latency, $L_{CLIENT}$ (min) is the client's minimum latency, $L_{CLIENT}$ (max) is the client's maximum latency, and wherein the $L_{CLIENT}$ (min) is computed using:

$$L_{CLIENT}(min)=L_N+L_{Pmax}+FD_C,$$

where $FD_C$ is the time needed to output the frame onto the output device 120. This may be same as the frame duration as per client's system clock. Further, the client's maximum latency ($L_{CLIENT}$ (max)) is computed using:

$$L_{CLIENT}(max)=L_N+L_{Pmax}+FD_C+FD_C,$$

where the second $FD_C$ is to handle the clock drifts.

An example calculation for $L_{CLIENT}$ (min) and $L_{CLIENT}$ (max) are as follows. Consider the scheduling jitter in software systems would be around 1 ms. Given perfect network conditions ($J_N=0$ jitter and $T_N=0$ delay), for 1080p60 video with 4 slices per frame, latency introduced can be as low as shown below:

$$L_N=1 \text{ ms (scheduling latency)},$$

$$L_{Pmax}=4+8+1+1=14 \text{ ms},$$

$$L_{CLIENT}(min)=31 \text{ ms},$$

$$L_{CLIENT}(max)=48 \text{ ms},$$

with a server latency of 10 ms, maximum end-to-end latency ($L_{END-TO-END}(max)$) possible is 58 ms.

Further, the predetermined maximum and minimum end-to-end latencies are programmed into the clock drift control block 306A. Furthermore, the size of the output buffer 118 may be configured to hold a minimum of $L_N+L_{Pmax}+FD_C$ worth of decoded data. At 502, the clock drift control block 306A may calculate latency ($L_I$) of each frame by subtracting frame's capture time from the current time. At 504, the latency ($L_I$) undergone by each frame is compared with the predetermined maximum latency ($L_{END-TO-END}(max)$) and the predetermined minimum latency ($L_{END-TO-END}(min)$). $L_I$ is given by $$L_I=L_{PI}+L_N+L_{SERVER}$$

At 506, the clock drift control block 306A may drop/skip (i.e., down convert sampling rate) decoded units having latency greater than the predetermined maximum latency ($L_{END-TO-END}(max)$) and send the feedback to the output rate control unit 124. At 508, the clock drift control block 306A may hold/repeat decoded units with latency less than the predetermined minimum latency ($L_{END-TO-END}(min)$) for a time of $L_{END-TO-END}(min)-L_I$. At 510, the clock drift control block 306A may forward the decoded unit having the latency ($L_I$) between the predetermined minimum latency and the predetermined maximum latency to the output device 120 (e.g., display device) without any conversion.

In some examples, when frame latencies are continuously greater than the $L_{END-TO-END}(max)$, the clock drift control block 306A may direct the client 100 to flush all its buffers and reset. The clock drift control block 306A may indicate the same to the server 152 so that the server 152 can check and correct any of the latency related anomalies. In one example, custom fields are used to transfer frame capture time along with PTS and DTS in moving picture experts group2-transport stream (MPEG-2 TS). This logic takes care of handling any network and processing Jitter as maximum and minimum delay values are programmed into the clock drift control block 306A and include fixed delays for various jitter handling.

FIG. 6 illustrates another example logic 306B for controlling the flow of the decoded units by converting the sampling rate of the one or more decoded units based on the rate of reception of the decoded units by the output buffer 118 and the rate at which the output device 120 is operating. FIG. 6 illustrates the example logic 306B for the clock drift control block 306 of the output rate control unit 124.

When the client 100 has no reliable mechanism to synchronize client's system clock with the server's system clock, the sampling rate of one or more decoded units may be converted based on the rate of reception of the decoded units by the output buffer 118 and the rate at which the output device 120 is operating as explained below with respect to FIG. 6.

At 602, a frame is received by the clock drift control block 306B. At 604, a check is made to determine whether the frame is received before the predefined initial duration ($D_{INIT}$). If the frame is received before the $D_{INIT}$, the rate at which the output device 120 is generating the synchronization signals and the rate of reception of frames at the output buffer 118 are determined and the frame may be forwarded from the output buffer 118 to the output device 120 for playback/display, at 614. The determined rates are used to calculate a time interval for converting the sampling rate of the one or more frames after initial duration $D_{INIT}$ as follows:

During $D_{INIT}$ (e.g., during rendering of initial frames for a predefined duration), the clock drift control block 306B measures:

1. the rate at which the output device 120 (e.g., display device) generates the vertical synchronization signals. This would be the rate at which display device (e.g., 120) can display frames (e.g., $R_C$ frames/second). In most client platforms, clocks used for measurement of time and clocks for the display device 120 are generated from same crystal. So, there may not be any drift between the two clocks.
2. the rate at which frames arrive at the output buffer 118 (e.g., display buffer). This would be the rate at which frames were transmitted by the server 152.

Further, the time interval for skipping or repeating frames may be calculated as follows:
1. Server frame duration ($FD_S$) as measured at client is:

$FD_S=1/R_S$, wherein $R_S$ is the rate of reception of the frames by the output buffer 118.
2. Frame duration ($FD_C$) at client is measured using:

$FD_C=1/R_C$, wherein $R_C$ is the rate at which the output device 120 is generating the synchronization signals. As $R_S$ and $R_C$ are arrived at by averaging frame duration over the period of time, $D_{INIT}$ is arrived at to ensure the effects of network jitter and processing jitter at the server 152 are averaged out. Since these jitters are in order of second and millisecond (ms) respectively, $D_{INIT}$ of an order of few seconds should be sufficient.
3. Difference in the frame duration ($FD_{DIFF}$) between the server 152 and the client 100 is measured using:

$FD_{DIFF}=abs(FD_S-FD_C)$,

4. From client's perspective, number of frames for which the server 152 would have generated one extra (or one less) frame is computed using:

$N_{CLOCKDRIFT}=FD_C/FD_{DIFF}$ frames

5. Time taken by the server 152 to generate one more (or one less) frame as measured at client 100 is computed using:

$T_{CLOCKDRIFT}=FD_S*FD_C/FD_{DIFF}$, $T_{CLOCKDRIFT}$ is the time interval for skipping or repeating the one or more frames.

Furthermore, the sampling rate of the one or more frames may be converted after the $D_{INIT}$ using the corresponding calculated time interval as shown in blocks 606-612. If the frame is received after the $D_{INIT}$, at 606, a check is made to determine at least one of whether the frame is a first frame that is received after $D_{INIT}$ or whether the time ($T_{CLOCKDRIFT}$) is elapsed since the last action (i.e., a previous skip/repeat). If the frame is not the first frame that is received after $D_{INIT}$ and when the time has not elapsed since the last action, then the frame is forwarded from the output buffer 118 to the output device 120 for display, at 614. If the frame is the first frame that is received after $D_{INIT}$ or when the time has elapsed since the last action, the process goes to step 608.

At 608, a check is made to compare $FD_S$ and $FD_C$. At 610, the sampling rate of the frame is down converted by, for example, skipping the frame when the rate of reception of the frame by the output buffer 118 is greater than the rate at which the output device 120 is generating the synchronization signals (i.e., $FD_S<FD_C$). At 612, the sampling rate of the frame is up converted by, for example, repeating the previous frame when the rate of reception of the frame by the output buffer 118 is not greater than the rate at which the output device 120 is generating synchronization signals (i.e., $FD_S>FD_C$).

Thus, the example logic 306B may perform skip and repeat frame actions to contain latency variation at client 100 between 0 ms and $FD_C$ ms. In this case, the display buffer is configured to hold a minimum of $L_{Pmax}+FD_C$ worth of decoded data.

Figure 7:
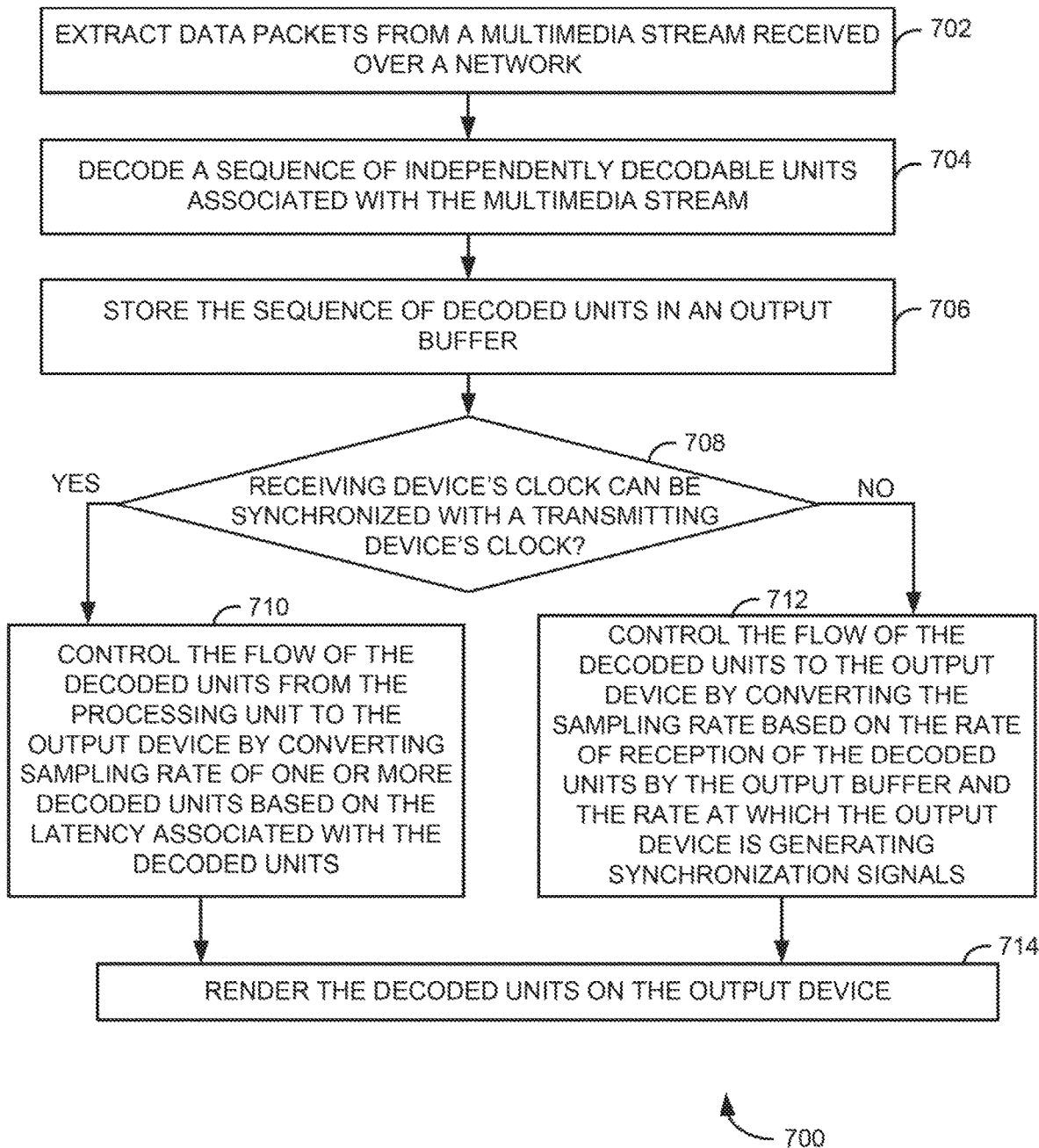
FIG. 7 illustrates an example flow chart of a method for low-latency multimedia stream reception and output in a receiving device.

FIG. 7 illustrates an example flow chart 700 of a method for low-latency multimedia stream reception and playback in a receiving device. It should be understood the process depicted in FIG. 7 represents generalized illustrations, and that other processes may be added or existing processes may be removed, modified, or rearranged without departing from the scope and spirit of the present application. In addition, the processes may represent instructions stored on a computer readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flowcharts illustrate functional information to design or fabricate circuits, generate machine-readable instructions, or use a combination of hardware and machine-readable instructions to perform the illustrated processes.

At 702, data packets may be extracted from a multimedia stream received over a network. In one example, the multimedia stream may be received from a transmitting device over the network, the data packets may be extracted from the received multimedia stream, and then the extracted data packets may be stored in a network buffer.

At 704, a sequence of independently decodable units associated with the multimedia stream may be decoded. Each independently decodable unit may include at one or more data packets. Example decodable unit may include a frame or a portion of the frame (e.g., slice) that can be decoded independently. At 706, the sequence of decoded units may be stored in an output buffer.

In one example, flow of the decoded units from the output buffer to an output device may be controlled based on: a) a latency associated with the decoded units or (b) a rate of reception of the decoded units by the output buffer and a rate at which the output device is generating synchronization signals as follows.

At 708, a check may be made to determine whether the receiving device's system clock can be synchronized with a transmitting device's system clock. When the receiving device's system clock can be synchronized with the transmitting device's system clock, at 710, the flow of the decoded units may be controlled from the processing unit to the output device by converting sampling rate of one or more decoded units based on the latency associated with the decoded units.

In one example, the latency associated with each decoded unit is calculated by subtracting a captured time associated with each decoded unit from a current time. The sampling rate of the one or more decoded units having the latency greater than a predetermined maximum latency may be down converted. Furthermore, the sampling rate of the one or more decoded units having the latency less than a predetermined minimum latency may be up converted. Also, the one or more decoded units having the latency between the predetermined minimum latency and the predetermined maximum latency may be forwarded to the output device without any conversion.

When the receiving device's system clock cannot be synchronized with the transmitting device's system clock, at 712, the flow of the decoded units may be controlled from the processing unit to the output device by converting the sampling rate of the one or more decoded units based on the rate of reception of the decoded units by the output buffer and the rate at which the output device is generating synchronization signals.

In one example, the rate at which the output device is generating synchronization signals and the rate of reception of the decoded units by the output buffer may be recorded during rendering of initial decoded units for a predefined duration. Further, a time interval for converting the sampling rate of the one or more decoded units may be calculated based on the rate at which the output device is generating the synchronization signals and the rate of reception of the decoded units by the output buffer. Furthermore, the sampling rate of the one or more decoded units may be converted after the predefined duration based on the corresponding calculated time interval.

In this case, for a decoded unit, a check is made to determine whether the calculated time interval has elapsed since a previous conversion of the sampling rate or whether the decoded unit is a first decoded unit after the after the predefined duration. When the calculated time interval has not elapsed since the previous conversion, the decoded unit may be forwarded to the output device. When the calculated time interval has elapsed since the previous conversion or when the decoded unit is a first decoded unit after the after the predefined duration, then:
 1. the sampling rate of the decoded unit may be down converted when the rate of reception of the decoded unit by the output buffer is greater than the rate at which the output device is generating the synchronization signals, and
 2. the sampling rate of decoded unit may be up converted when the rate of reception of the decoded unit by the output buffer is not greater than the rate at which the output device is generating synchronization signals.

At 714, the decoded units may be rendered on the output device. Example output device may include a display device to display the decoded units of multimedia stream. The above described system and method can be applied to video and audio data. For audio data, instead of skip and repeat of decoded units, sample rate down conversion and sample rate up conversions may be used to adjust sample durations to reduce introduced artifacts. The above described system and method can be applied to audio streams associated with video data.

Figure 8:
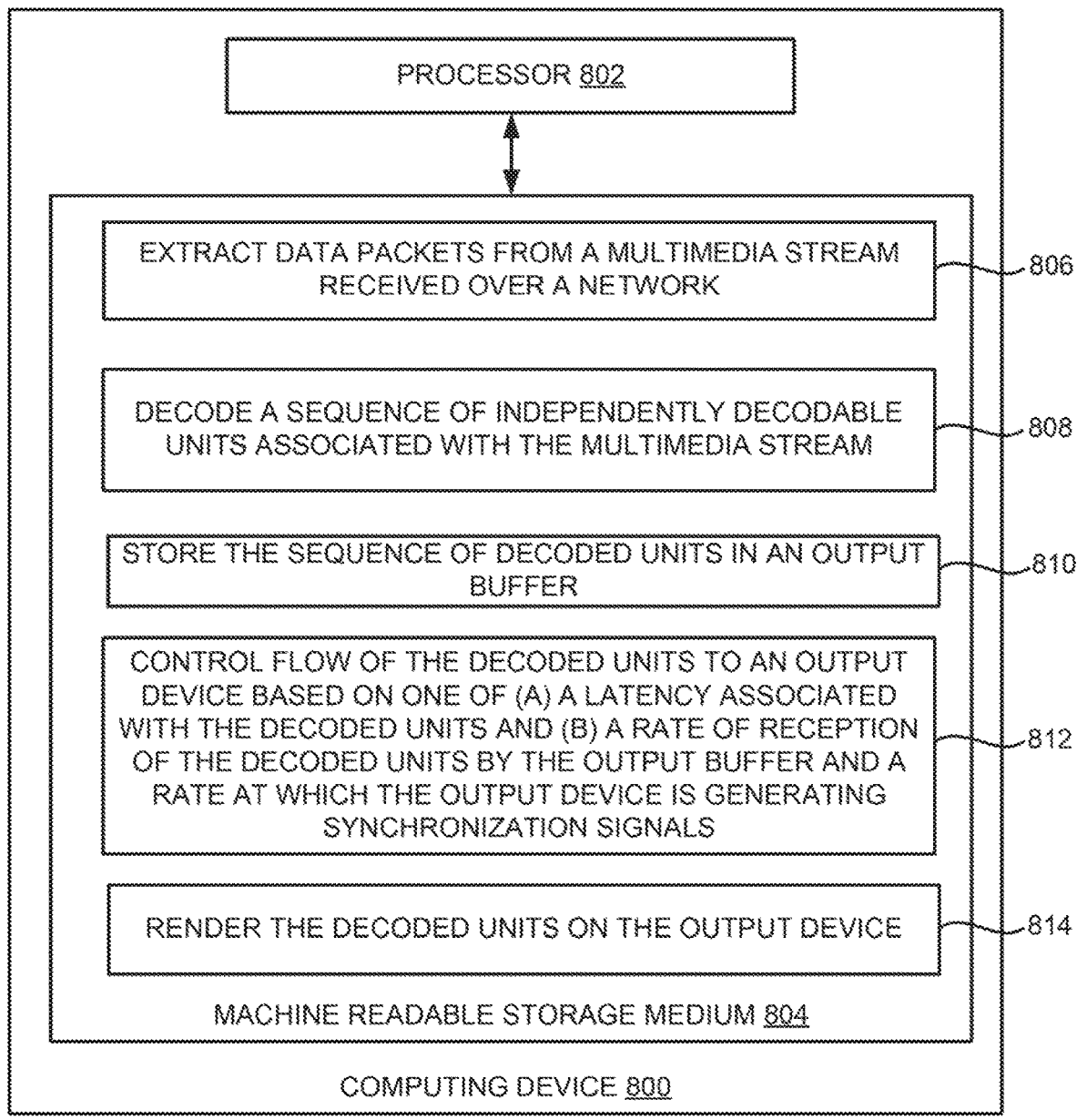
FIG. 8 illustrates a block diagram of an example computing device to enable low-latency multimedia streaming on an output device.

FIG. 8 illustrates a block diagram of an example computing device 800 to provide low-latency multimedia streaming on an output device. Computing device 800 may include processor 802 and a machine-readable storage medium/memory 804 communicatively coupled through a system bus. Processor 802 may be any type of central processing unit (CPU), microprocessor, or processing logic that interprets and executes machine-readable instructions stored in machine-readable storage medium 804. Machine-readable storage medium 804 may be a random access memory (RAM) or another type of dynamic storage device that may store information and machine-readable instructions that may be executed by processor 802. For example, machine-readable storage medium 804 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 804 may be a non-transitory machine-readable medium. In an example, machine-readable storage medium 804 may be remote but accessible to computing device 800.

Machine-readable storage medium 804 may store instructions 806-814. In an example, instructions 806-814 may be executed by processor 802 to provide low-latency multimedia streaming on an output device. Instructions 806 may be executed by processor 802 to extract data packets from a multimedia stream received over a network. Instructions 808 may be executed by processor 802 to decode a sequence of independently decodable units associated with the multimedia stream. Each independently decodable unit may include one or more data packets. Instructions 810 may be executed by processor 802 to store the sequence of decoded units in an output buffer.

Instructions 812 may be executed by processor 802 to control flow of the decoded units from the output buffer to an output device based on one of (a) a latency associated with the decoded units and (b) a rate of reception of the decoded units by the output buffer and a rate at which the output device is generating synchronization signals. Instructions 814 may be executed by processor 802 to render the decoded units on the output device.

Also, although certain terms are used primarily herein, other terms could be used interchangeably to yield equivalent embodiments and examples. For example, the term "device" may be used interchangeably with "physical host", "physical machine", "physical device", or "communication device". Further for example, the terms "host", "transmitting device" and "sender" may be used interchangeably throughout the document. Furthermore, the terms "client", "recipient device", and "receiver" may be used interchangeably throughout the document. The terms "image", and "picture" may be used interchangeably throughout the document.

It may be noted that the above-described examples of the present solution are for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A receiving device comprises:
   a network unit to extract data packets from a multimedia stream received over a network;
   a processing unit comprising:
      a decoder to decode a sequence of independently decodable units associated with the multimedia stream to output a sequence of decoded units, wherein each independently decodable unit comprises at least one data packet; and
      an output buffer to store the sequence of decoded units;
   an output rate control unit to control flow of the decoded units from the processing unit to an output device based on one of (a) a latency associated with the decoded units and (b) a rate of reception of the decoded units by the output buffer and a rate at which the output device is operating, wherein the output device is to render the decoded units; and
   a clock synchronization unit to:
      determine whether the receiving device's system clock can be synchronized with a transmitting device's system clock;
   wherein the output rate control unit is to:
      when the receiving device's system clock can be synchronized with the transmitting device's system clock, control the flow of the decoded units from the processing unit to the output device by converting sampling rate of one or more decoded units based on the latency associated with the decoded units; and
      when the receiving device's system clock cannot be synchronized with the transmitting device's system clock, control the flow of the decoded units from the processing unit to the output device by converting the sampling rate of the one or more decoded units based on the rate of reception of the decoded units by the output buffer and the rate at which the output device is operating.

2. The receiving device of claim 1, wherein controlling the flow of the decoded units by converting the sampling rate of the one or more decoded units based on the latency associated with the decoded units, comprises:
   calculating the latency associated with each decoded unit by subtracting a captured time associated with each decoded unit from a current time;
   down converting the sampling rate of the one or more decoded units having the latency greater than a predetermined maximum latency;
   up converting the sampling rate of the one or more decoded units having the latency less than a predetermined minimum latency; and
   forwarding the one or more decoded units having the latency between the predetermined minimum latency and the predetermined maximum latency to the output device without any conversion.

3. The receiving device of claim 2, wherein the predetermined maximum latency and the predetermined minimum latency are computed using:

$$L_{END\text{-}TO\text{-}END}(\max) = L_{TRANSMITTING\ DEVICE} + L_{RECEIVING\ DEVICE}(\min) + FD,\ \text{and}$$

$$L_{END\text{-}TO\text{-}END}(\min) = L_{TRANSMITTING\ DEVICE} + L_{RECEIVING\ DEVICE}(\min),$$

wherein $L_{END\text{-}TO\text{-}END}(\max)$ is the predetermined maximum latency, $L_{END\text{-}TO\text{-}END}(\min)$ is the predetermined minimum latency, $L_{TRASMITTING\ DEVICE}$ is a maximum latency associated with the transmitting device, FD is a duration of a decoded unit, and $L_{RECEIVING\ DEVICE}(\min)$ is a minimum latency associated with the receiving device.

4. The receiving device of claim 1, wherein controlling the flow of the decoded units by converting the sampling rate of the one or more decoded units based on the rate of reception of the decoded units by the output buffer and the rate at which the output device is operating, comprises:
   recording the rate at which the output device is operating and the rate of reception of the decoded units by the output buffer during rendering of initial decoded units for a predefined duration;
   calculating a time interval for converting the sampling rate of the one or more decoded units based on the rate at which the output device is operating and the rate of reception of the decoded units by the output buffer; and
   converting the sampling rate of the one or more decoded units after the predefined duration based on the corresponding calculated time interval.

5. The receiving device of claim 4, wherein converting the sampling rate of the one or more decoded units after the predefined duration based on the corresponding calculated time interval, comprises:
   for a decoded unit, determining whether the calculated time interval has elapsed since a previous conversion of the sampling rate;
   when the calculated time interval has not elapsed since the previous conversion, forwarding the decoded unit to the output device;
   when the calculated time interval has elapsed since the previous conversion:
      down converting the sampling rate of the decoded unit when the rate of reception of the decoded unit by the output buffer is greater than the rate at which the output device is operating; and
      up converting the sampling rate of decoded unit when the rate of reception of the decoded unit by the output buffer is not greater than the rate at which the output device is operating.

6. The receiving device of claim 4, wherein the time interval for converting the sampling rate of the one or more decoded units is calculated using:

$$T_{CLOCKDRIFT} = FD_S * FD_C / FD_{DIFF},$$

wherein $FD_C$ refers to a duration of decoded units at the receiving device, $FD_S$ refers to a duration of decoded units of the transmitting device as measured at the receiving device, and $FD_{DIFF}$ refers to difference in duration of the decoded units between the transmitting device and the receiving device.

7. The receiving device of claim 6, wherein the $FD_C$, $FD_S$, and $F_{DIFF}$ are computed using:

$$FD_C = 1/R_C,$$

wherein $R_C$ is the rate at which the output device is operating, $$FD_S = 1/R_S,$$

wherein $R_S$ is the rate of reception of the decoded units by the output buffer, and $$FD_{DIFF} = abs(FD_S - FD_C).$$

8. The receiving device of claim 1, wherein the network unit comprises:
   a network reception unit to receive the multimedia stream from a transmitting device over the network;
   a depacketization unit to extract the data packets from the received multimedia stream; and
   a network buffer to store the extracted data packets.

9. The receiving device of claim 8, further comprising a network rate control unit to:
   control a rate and time at which the sequence of independently decodable units is extracted from the network buffer, wherein the decoder is to decode the sequence of independently decodable units associated with the multimedia stream that are extracted from the network buffer.

10. The receiving device of claim 1, wherein each decodable unit comprises one of a frame and a portion of the frame that can be decoded independently.

11. The receiving device of claim 1, wherein the processing unit comprises:
   a post processing unit communicatively connected between the decoder and the output buffer to post process the sequence of decoded units and to place the post processed sequence of decoded units into the output buffer.

12. A method for low-latency multimedia stream reception and output in a receiving device, comprising:
   extracting data packets from a multimedia stream received over a network;
   decoding a sequence of independently decodable units associated with the multimedia stream, wherein each independently decodable unit comprises at least one data packet;
   storing the sequence of decoded units in an output buffer;
   controlling flow of the decoded units from the output buffer to an output device based on one of (a) a latency associated with the decoded units and (C) a rate of reception of the decoded units by the output buffer and a rate at which the output device is operating, wherein controlling the flow of the decoded units from the output buffer to the output device comprises:
      determining whether the receiving device's system clock can be synchronized with a transmitting device's system clock;
      when the receiving device's system clock can be synchronized with the transmitting device's system clock, controlling the flow of the decoded units from the processing unit to the output device by converting sampling rate of one or more decoded units based on the latency associated with the decoded units; and
      when the receiving device's system clock cannot be synchronized with the transmitting device's system clock, controlling the flow of the decoded units from the processing unit to the output device by converting the sampling rate of the one or more decoded units based on the rate of reception of the decoded units by the output buffer and the rate at which the output device is operating; and
   rendering the decoded units on the output device.

13. The method claim 12, wherein controlling the flow of the decoded units by converting the sampling rate of the one or more decoded units based on the latency associated with the decoded units, comprises:
   calculating the latency associated with each decoded unit by subtracting a captured time associated with each decoded unit from a current time;
   down converting the sampling rate of the one or more decoded units having the latency greater than a predetermined maximum latency;
   up converting the sampling rate of the one or more decoded units having the latency less than a predetermined minimum latency; and
   forwarding the one or more decoded units having the latency between the predetermined minimum latency and the predetermined maximum latency to the output device without any conversion.

14. The method of claim 13, wherein the predetermined maximum latency and the predetermined minimum latency are computed using:

$$L_{END\text{-}TO\text{-}END}(max) = L_{TRANSMITTING\ DEVICE} + L_{RECEIVING\ DEVICE}(min) + FD,\ \text{and}$$

$$L_{END\text{-}TO\text{-}END}(min) = L_{TRANSMITTING\ DEVICE} + L_{RECEIVING\ DEVICE}(min),$$

wherein $L_{END\text{-}TO\text{-}END}(max)$ is the predetermined maximum latency, $L_{END\text{-}TO\text{-}END}(min)$ is the predetermined minimum latency, $L_{TRANSMITTING\ DEVICE}$ is a maximum latency associated with the transmitting device, $FD$ is a duration of a decoded unit, and $L_{RECEIVING\ DEVICE}(min)$ is a minimum latency associated with the receiving device.

15. The method of claim 12, wherein controlling the flow of the decoded units by converting the sampling rate of the one or more decoded units based on the rate of reception of the decoded units by the output buffer and the rate at which the output device is operating, comprises:
   recording the rate at which the output device is operating and the rate of reception of the decoded units by the output buffer during rendering of initial decoded units for a predefined duration;
   calculating a time interval for converting the sampling rate of the one or more decoded units based on the rate at which the output device is operating and the rate of reception of the decoded units by the output buffer; and
   converting the sampling rate of the one or more decoded units after the predefined duration based on the corresponding calculated time interval.

16. The method of claim 15, wherein converting the sampling rate of the one or more decoded units after the predefined duration based on the corresponding calculated time interval, comprises:
   for a decoded unit, determining whether the calculated time interval has elapsed since a previous conversion of the sampling rate;

when the calculated time interval has not elapsed since the previous conversion, forwarding the decoded unit to the output device;

when the calculated time interval has elapsed since the previous conversion:
  down converting the sampling rate of the decoded unit when the rate of reception of the decoded unit by the output buffer is greater than the rate at which the output device is operating; and
  up converting the sampling rate of decoded unit when the rate of reception of the decoded unit by the output buffer is not greater than the rate at which the output device is operating.

17. The method of claim 15, wherein the time interval for converting the sampling rate of the one or more decoded units is calculated using:

$$T_{CLOCKDRIFT} = FD_S * FD_C / FD_{DIFF},$$

wherein $FD_C$ refers to a duration of decoded units at the receiving device, $FD_S$ refers to a duration of decoded units of the transmitting device as measured at the receiving device and $FD_{DIFF}$ refers to difference in duration of the decoded units between the transmitting device and the receiving device, and wherein the $FD_C$, $FD_S$ and $FD_{DIFF}$ are computed using:

$$FD_C = 1/R_C,$$

wherein $R_C$ is the rate at which the output device is operating, $$FD_S = 1/R_S,$$

wherein $R_S$ is the rate of reception of the decoded units by the output buffer, and $$FD_{DIFF} = abs(FD_S - FD_C).$$

18. A non-transitory computer-readable storage medium comprising instructions executable by a cloud-based server to:
  extract data packets from a multimedia stream received over a network;
  decode a sequence of independently decodable units associated with the multimedia stream, wherein each independently decodable unit comprises at least one data packet;
  store the sequence of decoded units in an output buffer;
  control flow of the decoded units from the output buffer to an output device based on one of (a) a latency associated with the decoded units and (b) a rate of reception of the decoded units by the output buffer and a rate at which the output device is operating, wherein controlling the flow of the decoded units from the output buffer to the output device comprises:
    determining whether a receiving device's system clock can be synchronized with a transmitting device's system clock;
    when the receiving device's system clock can be synchronized with the transmitting device's system clock, controlling the flow of the decoded units from the processing unit to the output device by converting sampling rate of one or more decoded units based on the latency associated with the decoded units; and
    when the receiving device's system clock cannot be synchronized with the transmitting device's system clock, controlling the flow of the decoded units from the processing unit to the output device by converting the sampling rate of the one or more decoded units based on the rate of reception of the decoded units by the output buffer and the rate at which the output device is operating,
  render the decoded units on the output device.

19. The non-transitory computer-readable storage medium of claim 18, wherein controlling the flow of the decoded units by converting the sampling rate of the one or more decoded units based on the latency associated with the decoded units, comprises:
  calculating the latency associated with each decoded unit by subtracting a captured time associated with each decoded unit from a current time;
  down converting the sampling rate of the one or more decoded units having the latency greater than a predetermined maximum latency;
  up converting the sampling rate of the one or more decoded units having the latency less than a predetermined minimum latency; and
  forwarding the one or more decoded units having the latency between the predetermined minimum latency and the predetermined maximum latency to the output device without any conversion.

20. The non-transitory computer-readable storage medium of claim 18, wherein controlling the flow of the decoded units by converting the sampling rate of the one or more decoded units based on the rate of reception of the decoded units by the output buffer and the rate at which the output device is operating, comprises:
  recording the rate at which the output device is operating and the rate of reception of the decoded units by the output buffer during rendering of initial decoded units for a predefined duration;
  calculating a time interval for converting the sampling rate of the one or more decoded units based on the rate at which the output device is operating and the rate of reception of the decoded units by the output buffer; and
  converting the sampling rate of the one or more decoded units after the predefined duration based on the corresponding calculated time interval.

21. The non-transitory computer-readable storage medium of claim 20, wherein converting the sampling rate of the one or more decoded units after the predefined duration based on the corresponding calculated time interval, comprises:
  for a decoded unit, determining whether the calculated time interval has elapsed since a previous conversion of the sampling rate;
  when the calculated time interval has not elapsed since the previous conversion, forwarding the decoded unit to the output device;
  when the calculated time interval has elapsed since the previous conversion:
    down converting the sampling rate of the decoded unit when the rate of reception of the decoded unit by the output buffer is greater than the rate at which the output device is operating; and
    up converting the sampling rate of decoded unit when the rate of reception of the decoded unit by the output buffer is not greater than the rate at which the output device is operating.

* * * * *